United States Patent [19]

Lucas et al.

[11] Patent Number: 5,439,949

[45] Date of Patent: * Aug. 8, 1995

[54] PROPYLENE COMPOSITIONS WITH IMPROVED RESISTANCE TO THERMOFORMING SAG

[75] Inventors: Bennie M. Lucas; V. Krishnamurthy; John R. Bonser, all of Odessa, Tex.

[73] Assignee: Rexene Corporation, Dallas, Tex.

[*] Notice: The portion of the term of this patent subsequent to Nov. 30, 2010 has been disclaimed.

[21] Appl. No.: 883,897

[22] Filed: May 11, 1992

Related U.S. Application Data

[63] Continuation of Ser. No. 747,964, Aug. 21, 1991, abandoned.

[51] Int. Cl.6 ............................................. C08J 3/28
[52] U.S. Cl. .................................... 522/157; 522/76; 522/78; 522/79; 522/161; 525/240
[58] Field of Search ............... 522/157, 161, 76, 78, 522/79; 525/240

[56] References Cited

U.S. PATENT DOCUMENTS

| | | | |
|---|---|---|---|
| 3,349,018 | 10/1967 | Potts | 522/157 |
| 4,282,076 | 8/1981 | Boynton | 522/157 |
| 4,507,415 | 3/1985 | Kasai | 522/157 |
| 4,598,128 | 7/1986 | Randall | 522/161 |
| 4,628,073 | 12/1986 | Fisher | 522/159 |
| 4,727,113 | 2/1988 | Kohyama | 522/157 |
| 4,888,369 | 12/1989 | Moore | 522/76 |
| 4,916,198 | 4/1990 | Scheve | 522/129 |

FOREIGN PATENT DOCUMENTS 3415063 11/1985 Germany.

OTHER PUBLICATIONS

Translation of German DE 3,415,063 (Kirch).
Cross-Linking with Radiation, Encyclopedia of Polymer Science, vol. 4, pp. 418-449.
Radiation-Resistant Polymers, Encyclopedia of Polymer Science, vol. 14, pp. 667-708.

*Primary Examiner*—Mark A. Chapman
*Attorney, Agent, or Firm*—Harold E. Meier

[57] ABSTRACT

Polymer compositions having improved resistance to thermoforming sag are disclosed. The compositions comprise a first and second portion selected from the group comprising polypropylene, propylene-ethylene copolymers and mixtures thereof wherein a first portion of the composition is (1) mixed with from about 500 to about 3000 ppm of antioxidant; and (2) irradiated with a dosage of from about 10 to about 20 Mrads gamma or electron beam of ionizing radiation in air, and the second portion of said polymer composition is non-irradiated. The first portion is present in an amount effective, from about 1.0% to about 10.0%, to increase the elasticity of the polymer composition in the molten state by at least 10% as compared to the second portion of said polymer composition.

4 Claims, No Drawings

5,439,949

PROPYLENE COMPOSITIONS WITH IMPROVED RESISTANCE TO THERMOFORMING SAG

This application is a continuation of Ser. No. 07/747,964, filed Aug. 21, 1991, now abandoned.

TECHNICAL FIELD

This invention relates to propylene compositions having improved resistance to thermoforming sag and a method for producing such compositions.

BACKGROUND OF THE INVENTION

Thermoforming is a two step process of heating a thermoplastic material to a workable temperature, typically sightly below the material's melting point, and then vacuum or pressure forming the material into the desired shape through one of several techniques. Thermoforming processes are used to produce deli and drinking cups, storage containers and the like from extruded polypropylene, propylene/ethylene copolymer and other materials. Various thermoforming techniques are described in the 1989 mid-October issue of *Modern Plastics Encyclopedia*, pp. 301–306.

During the heating step it is highly desirable to reach a uniform temperature distribution across the sheet of thermoplastic material in order to achieve a more uniform distribution of material in the part to be produced. Heating the thermoplastic material, however, tends to cause the material to sag under the influence of gravity; this tendency is known as thermoforming sag. The extent of thermoforming sag is an important parameter as it controls the "window of operation" for the thermoforming process. In other words, the tendency of the thermoplastic material to sag when heated limits the time available to achieve a uniform temperature distribution across the sheet and thus limits the time/temperature window of operation.

Typical polypropylene and propylene/ethylene copolymers used in thermoforming processes have a general tendency to sag when heated. Thus there is a need for polypropylene and propylene/ethylene copolymers suitable for use in thermoforming processes that have an increased resistance to thermoforming sag.

Boynton, U.S. Pat. No. 4,282,076 discloses a method of visbreaking polypropylene wherein a prodegradant is formed by activating a first portion of a polypropylene polymer, mixing the prodegradant with a second portion of propylene polymer which may contain a stabilizing amount of at least one antioxidant, wherein the second portion is at least equal in amount to the prodegradant, adding to the mixture of the prodegradant and second portion of the propylene polymer a stabilizing amount of at least one antioxidant if the second portion does not already contain a stabilizing amount of such a stabilizer, and heating the mixture to an extrusion temperature to controllably lower the molecular weight of the mixture, while substantially retaining the stabilizing effect of the antioxidant stabilizer or stabilizers. The prodegradant is produced by activating a portion of the polypropylene polymer by exposure to ionizing radiation or air oxidation.

Kohyama et al., U.S. Pat. No. 4,727,113, discloses a crystalline 1-butene comprising: (a) a crystalline 1-butene polymer containing a 1-butene component as a main component, and (b) a radical-treated crystalline olefinic polymer having (1) a boiling p-xylene insoluble content of 30% by weight at most and (2) the difference between the crystallization temperature of the radical-treated crystalline olefinic polymer and the crystallization temperature of the crystalline olefinic polymer before the radical treatment being greater than or equal to 1, and (c) the proportion of the radical-treated crystalline olefinic polymer (b) being 0.2 to 100 parts by weight of the crystalline 1-butene polymer. The radical treatment purportedly may be carried out by treating the crystalline olefinic polymer in the molten state by the action of a shearing force in the presence of a crosslinking agent and a polymerization initiator, or exposing the crystalline olefinic polymer to light irradiation or ionizing irradiation in the presence of a photo-polymerization initiator.

Kirch, German Application DE 3,415,063, discloses a process for nucleation of partially crystalline plastics by irradiation wherein neutron beams are applied. Purportedly, the neutron beams, because of their different physical mode of action, as compared to electron, X-ray, gamma or ultraviolet beams, interact primarily with hydrogen atoms which reduces the number of chain breaks. Moreover, Kirch states that treatment with electron, X-ray, gamma or ultraviolet beams cause an undesired intensive degradation which alters the properties of the starting polymers. Kirch discloses neutron emitters such as americium-241/beryllium, californium-252, spent nuclear fuel rods and neutron radiation occurring in the operation of nuclear reactors as irradiation sources.

Fisher, U.S. Pat. No. 4,628,073 discloses a soft-rubbery matrix material, and a method of producing the material, wherein the material is composed of 0.3–70 micron particles of a 50,000–300,000 molecular weight cross-linkable polymer dispersed in a fluxable elastomer where the polymer's softening point temperature exceeds the elastomer's fluxing temperature and the polymer and elastomer are combined and mixed at a temperature maintained above the fluxing temperature of the elastomer but below the softening point temperature of the polymer. When a cross-linked polymer component is desired, high-energy ionizing radiation induced crosslinking is the preferred practice.

Potts, U.S. Pat. No. 3,349,018, discloses a method for controllably degrading alpha olefin polymers such as polypropylene without the use of heat and/or mechanical shear. In the method of Potts, polypropylene is degraded by subjecting it to ionizing radiation to a total dose of between about 0.01 to about 3 megareps but below that amount which causes gelation. The results of the method of Potts are attributed to uniform treatment of every portion of the resin mass by high energy ionizing radiation and it is stated that in the process each molecule of resin is surrounded by a cloud of high energy particles so that no portion of the polymer is able to escape treatment. Additionally, in a preferred embodiment of Potts, a small amount of antioxidant, preferably about 0.01 to about 0.1 percent by weight of anti-oxidant is incorporated prior to subjecting the polymer to ionizing irradiation.

Scheve, U. S. Pat. No. 4,916,198, discloses a purportedly normally solid, high molecular weight, gel-free, amorphous to predominantly crystalline, propylene polymer characterized by high melt strength due to strain hardening believed to be caused by free-end long chain branches of the molecular chains forming the polymer. The material is characterized by a branching index preferably less than 0.9 and most preferably about 0.2–0.4. Scheve also discloses a process for making the polymer by high energy radiation of a normally solid, high molecular weight, linear polypropylene polymer in a reduced oxygen environment, maintaining the irradiated material in such environment for a specific period of time, and then deactivating free radicals in the material.

There remains, however, a need for a polypropylene or propylene/ethylene copolymer with improved thermmoforming sag resistance. Preferably, the polypropylene or propylene/ethylene copolymer with improved thermoforming sag is practically and readily obtained to provide the advantages of improved thermmoforming sag resistance.

SUMMARY OF THE INVENTION

The present invention provides a polypropylene or propylene/ethylene composition suitable for the production of articles through the use of thermoforming processes, the composition having improved thermoforming sag resistance. The polymer composition is prepared by (1) mixing from about 500 ppm to about 3,000 ppm of antioxidant with a first portion of polypropylene or propylene-ethylene copolymer, (2) irradiating the first portion to a total of dosage of from about 10 Mrad to about 20 Mrad of ionizing radiation in air to induce cross-linking in the first portion of the polymer, mixing the irradiated polymer with a second, non-irradiated polypropylene or propylene-ethylene copolymer portion to increase the thermoforming sag resistance when sheets extruded from the composition are thermoformed into various articles. Preferably, from at least about 1.0% to about 10.0% of the polymer, including antioxidant, is irradiated to a total dosage of about 15 Mrad to about 25 Mrad of ionizing radiation in air to induce cross linking and mixed with the non-irradiated polymer. The irradiation step is conducted in air, thereby eliminating the need for a reduced oxygen atmosphere and associated equipment.

DETAILED DESCRIPTION

The treatment of a polymer with sufficient ionizing radiation triggers a complex chain of events that leads to the generation of free radicals, polymer chain scissioning and cross-linking. The scissioning and cross-linking processes are believed to occur simultaneously and are generally a function of the polymer type, with one of the two processes normally predominating. In the case of polypropylene, when irradiation is carried out in air, the predominant process is chain scissioning rather than cross-linking. Chain scissioning has the effect of increasing the melt flow rate (MFR) as determined by ASTM method D1238, condition L. Cross-linking has the opposite effect, lowering the melt flow rate.

Ionizing radiation may consist of gamma rays or an electron beam. Ionizing radiation is measured in rads, and is normally expressed in megarads (Mrads) or millions of rads. Gamma rays may be provided from radioactive materials such as cobalt 60 and are highly penetrating but have a relatively slow process rate. Ionizing radiation may also be provided in the form of an electron beam from an electron beam accelerator which is normally characterized by the accelerator voltage and the electron beam current, or the number of electrons delivered per second. Electrons are less penetrating than gamma rays, but electron accelerators may have more capacity than gamma ray sources, up to several hundred kilowatts.

When polypropylene or propylene-ethylene copolymers are treated with sufficient ionizing radiation, free radicals are formed and chain scission occurs as chemical bonds are broken. The free radicals thus formed also lead to cross-linking of the polymers. Chain scissioning of the polymer, however, degrades the polymer and as such, is normally undesirable. In accordance with the present invention, a selected amount of anti-oxidant is added to the polymer prior to exposing the polymer to ionizing radiation, and cross-linking is accomplished while chain scission is controlled at an acceptable level. The addition of excessive amounts of antioxidants, however, inhibits cross-linking to an undesirable extent. Preferably, antioxidant is added to the polymer at a rate of from about 500 to about 3000 ppm. More preferably, from about 500 ppm to about 1,500 ppm of antioxidant is used to control chain scission. Variation above and below these limits may be possible depending upon the effectiveness of the particular anti-oxidant and the absorbed radiation dosage. Antioxidants suitable for use in connection with the practice of the present invention include substituted phenols, amines, alkyl, aryl, and mixed alkyl-aryl phosphites, alkyl, aryl, and mixed alkyl-aryl phosphonates, alkali or alkaline metal salts of phosphonates, thioesters, thio compounds containing oxidizable sulphur and aryl nitroso compounds Preferred antioxidants include 4,4',4''-[(2,4,6-trimethyl-1,3,5-benzenetriyl)tris(methylene)]tris[2,6-bis(1,1 dimethylethyl)phenol], 2,6-di-tert-butyl-para-cresol, (2,2-bis[[3 3,5-bis(1,1 dimethylethyl)-4-hydroxyphenyl]-1-oxopropoxy]methyl]-1,3-propanoate propanediyl 3,5-bis(1,1-dimethylethyl)-4-hydroxybenzene and 2,4-bis(1,1-dimethylethyl)phenylphosphite and mixtures thereof.

In the practice of the present invention, it is not necessary or desirable to treat all of the polymer composition to achieve the desired results. It is also not necessary or desirable to expose the portion of the polymer composition to be irradiated to ionizing radiation in a reduced oxygen atmosphere. Increased thermoforming sag resistance is achieved by treating a relatively small portion, from about 1.0% to about 10.0% of the polymer composition with antioxidant and exposing the polymer/antioxidant mixture to ionizing radiation in air to induce cross-linking. Preferably, cross-linking is induced to the extent that a least a portion of the irradiated polymer is gelled as determined by an increase in xylene insoluble content compared to the non-irradiated base polymer.

Without wishing to be bound to any particular theory, it is believed that the crosslinked portion of the polypropylene or propylene/ethylene copolymer behaves as a rubbery phase, imparting elasticity to the polymer composition when it is in a molten or semi-molten state. The elasticity of the polymer in the molten state can be defined by a compliance number ($J_e^o$)

$$(J_e^o) = \lim_{w \to 0} \{G' / (G'')^2\}$$

where $G'$ and $G''$ represent the storage modulus and the loss modulus respectively and are measured in dynamic analysis as a function of frequency ($w$). See ASTM D4440 *Standard Practice for Rheological Measurement of Polymer Melts Using Dynamic Mechanical Procedures*; ASTM D 4092 *Standard Terminology Relating to Dy-* namic *Mechanical Measurements on Plastics*; John D. Ferry *Viscoelastic Properties of Polymers* (Wiley & Sons, 3rd ed, 1980), incorporated herein by reference. Thus, the ratio $G'/(G'')^2$ approximates $(J_e^0)$ at relatively low frequencies.

Preferably, the irradiated polymer is present in an amount, for example from about 1.0% to about 10.0%, effective to increase the elasticity, as defined by the compliance number, of the polymer composition in the molten state by at least 10% as compared to same polymer composition without the irradiated polymer. It should be noted that the theorized elasticity is limited to the molten or semi-molten state and that the irradiated material is brittle at room temperature.

Polypropylene and propylene/ethylene copolymers irradiated in the dosage range from about 10 Mrads to about 20 Mrads appear to offer the greatest improvement in thermoforming sag resistance when added to an non-irradiated base polymer at rates of from about 1% to about 10%. At dosage levels below about 10 Mrads, the extent of cross-linking is not sufficient to impart the desired elasticity to the polymer in the molten state. This suggests that the irradiated material preferably contains some minimum level of xylene insoluble content, for example 30%, which reflects the level of cross-linking. At dosage levels above about 20 Mrads, the extent of crosslinking is such that the polymer does not flow well in the melt and is less effective.

As crosslinking of the polymer is believed to be related to the increase in thermoforming sag resistance, irradiation of the polymer preferably optimizes the extent of crosslinking. In a polypropylene or propylene/ethylene copolymer, the longer polymer chains are more sensitive to irradiation which increases the potential for crosslinking of longer polymer chains as compared to shorter polymer chains. Longer polymer chains are associated with lower melt flow rates. Consequently polypropylenes or propylene/ethylene copolymers with a low melt flow rate, for example less than about 0.5 g/10 minutes and a broad molecular weight distribution, for example a molecular weight distribution in which the ratio of the weight average molecular weight to the number average molecular weight $(M_w/M_n)$ is greater than about 5.0, are preferred. Additionally, random copolymers of propylene and ethylene exhibit a greater tendency to crosslink than propylene homopolymer, the tendency increasing with increasing ethylene content. Thus, propylene/ethylene copolymers with, for example, at least about 6% by weight ethylene are also preferred.

When the irradiated polymer is added to non-irradiated base polymer, the viscosity of the blended polymer composition decreases compared to the viscosity of the non-irradiated portion. Preferably, the decrease in viscosity in the blend of irradiated and nonirradiated polymer is minimized. Therefore polypropylene or propylene/ethylene copolymers that exhibit the smallest decrease in viscosity (increase in melt flow) after irradiation are of particular interest in the practice of the present invention. Preferably, the polypropylene or propylene/ethylene copolymer which is irradiated has a relatively low melt flow rate (MFR) as determined by ASTM 1238, condition L. More preferably, the irradiated material is a propylene/ethylene copolymer with a melt flow rate less than or equal to about 0.5 g/10 minutes and an ethylene content of about 6% by weight.

To quantify and confirm that increased elasticity in the melt enhances resistance to thermoforming sag, sheets extruded from polypropylene with and without irradiated polymer are heated in a thermoforming oven at various temperatures and the time in which the sheets sag to an arbitrarily selected distance of 3 inches is measured. It is observed that the addition of as little as about 1% by weight of irradiated polymer significantly increases the amount of time in required for the sheet to sag 3 inches, indicating a substantial increase in thermoforming sag resistance.

In the preparation of the composition, a small side stream of the polymer, from about 1.0% to about 10.0% may be separated from the polymer stream, mixed with an antioxidant, exposed to gamma or electron beam ionizing radiation in air and then recombined with the nonirradiated polymer stream. Alternatively, a fraction, from about 1.0% to about 10.0% of a prepared polymer may be treated in a batch operation and recombined with the untreated polymer. In this manner, thermoforming sag resistance of the polymer is enhanced rapidly, economically, and without the addition of any foreign substance to the polymer.

The invention will be further described with respect to the following examples; however, the scope of the invention is not to be limited thereby.

EXAMPLE I

Propylene-ethylene random copolymer, with about 6% ethylene was produced in a pilot plant. The copolymer was stabilized with about 1,500 ppm of a mixture of 50% by weight Irganox 1010 (2,2-bis[[3-[3,5-bis(1,1-dimethylethyl)-4-hydroxyphenyl]-1-oxopropoxy]methyl]-1,3-propanoate propanediyl 3,5-bis(1,1-dimethylethyl)-4-hydroxybenzene and 50% Irgafos 168 2,4-bis(1,1-dimethylethyl)phenyl-phosphite (3:1). The copolymer also contained about 250 ppm of a synthetic dihydro talcite and about 100 ppm calcium stearate. Irganox 1010 and Irgafos 168 are commercially available from CIBA-GEIGY and the synthetic dihydro talcite is available from Mitsui Chemical Co. of Houston, Texas under the trade designation DHT4A. Samples of the copolymer were irradiated to various dosages with gamma radiation. Samples of the irradiated copolymer were tested for melt flow rate and xylene insoluble content as determined by refluxing in boiling xylene for 12 hours. The results are set forth in Table 1 below.

TABLE 1

| Dosage (Mrads) | MFR (g/10 min.) | Xylene Insoluble Content (wt %) |
|---|---|---|
| 0.0 | 0.4 | 0.0 |
| 2.5 | 7.1 | 5.0 |
| 5.0 | 17.8 | 5.3 |
| 10.0 | 26.6 | 7.1 |
| 15.0 | 11.8 | 53.9 |
| 20.0 | 22.5 | 59.1 |
| 25.0 | 22.4 | 66.4 |

EXAMPLE II

The copolymer of Example I was irradiated to a dosage of 15 Mrads and mixed with a propylene homopolymer commercially available from Rexene Products Company of Odessa, Texas under the trade designation XO1215 at a rate of 1% by weight. The polypropylene homopolymer (polymer A) and the polymer composition containing 1% of irradiated copolymer (polymer B) were tested in accordance with ASTM D4440. The results are set forth in Table 2 below.

TABLE 2

| Frequency (Hz) | $\{G'/(G'')^2\}$ Values in $Pa^{-1}$ @ 210° C. | |
| --- | --- | --- |
| | Polymer A | Polymer B |
| 0.003 | $2.22 \times 10^{-4}$ | $2.71 \times 10^{-4}$ |
| 0.006 | $1.69 \times 10^{-4}$ | $2.19 \times 10^{-4}$ |
| 0.010 | $1.37 \times 10^{-4}$ | $1.70 \times 10^{-4}$ |
| 0.020 | $1.06 \times 10^{-4}$ | $1.26 \times 10^{-4}$ |
| 0.040 | $8.36 \times 10^{-5}$ | $9.80 \times 10^{-5}$ |
| 0.060 | $7.34 \times 10^{-5}$ | $8.46 \times 10^{-5}$ |
| 0.080 | $6.79 \times 10^{-5}$ | $7.69 \times 10^{-5}$ |
| 0.150 | $5.87 \times 10^{-5}$ | $6.42 \times 10^{-5}$ |
| 0.300 | $5.22 \times 10^{-5}$ | $5.57 \times 10^{-5}$ |
| 0.500 | $4.85 \times 10^{-5}$ | $5.04 \times 10^{-5}$ |

EXAMPLE III

The irradiated ethylene/propylene copolymer of Example II was mixed with a propylene homopolymer commercially available from Rexene Products Company of Odessa, Texas under the trade designation PP6310 at a rate of 5% by weight. The propylene homopolymer (polymer C) and the polymer composition containing the irradiated copolymer (polymer D) were tested as in Example II. The test results are set forth in Table 3 below.

TABLE 3

| Frequency (Hz) | $\{G'/(G'')^2\}$ Values in $Pa^{-1}$ @ 210° C. | |
| --- | --- | --- |
| | Polymer C | Polymer D |
| 0.010 | $1.67 \times 10^{-4}$ | $2.42 \times 10^{-4}$ |
| 0.020 | $1.23 \times 10^{-4}$ | $1.72 \times 10^{-4}$ |
| 0.040 | $9.51 \times 10^{-5}$ | $1.28 \times 10^{-4}$ |
| 0.060 | $8.25 \times 10^{-5}$ | $1.08 \times 10^{-4}$ |
| 0.080 | $7.46 \times 10^{-5}$ | $9.78 \times 10^{-5}$ |
| 0.150 | $6.16 \times 10^{-5}$ | $8.00 \times 10^{-5}$ |
| 0.300 | $5.26 \times 10^{-5}$ | $5.78 \times 10^{-5}$ |
| 0.500 | $4.68 \times 10^{-5}$ | $5.32 \times 10^{-5}$ |

EXAMPLE IV

Polymer A and polymer B of Example II were extruded into 40 mil and 70 mil sheets and heated in a laboratory thermoformer manufactured by Hydro-Trim Corp., West Nyak, N.Y. The times in which the sheets developed a 3 inch sag at various temperatures were recorded and set forth in Tables 4 and 5 below.

TABLE 4

| Time to 3 Inch Sag (seconds) of 40 mil sheet | | |
| --- | --- | --- |
| Oven Temp. (°F.) | Polymer A | Polymer B |
| 450 | 157.8 | 190.8 |
| 500 | 120.0 | 132.2 |
| 550 | 90.0 | 103.2 |
| 600 | 70.2 | 77.4 |

TABLE 5

| Time to 3 Inch Sag (seconds) of 70 mil sheet | | |
| --- | --- | --- |
| Oven Temp. (F.°) | Polymer A | Polymer B |
| 450 | 189.6 | 242.2 |
| 500 | 153.0 | 180.0 |
| 550 | 124.8 | 144.0 |
| 600 | 108.6 | 124.2 |

EXAMPLE V

The propylene homopolymer of Example II, along with propylene/ethylene copolymers containing varying levels of ethylene were tested for melt flow rate. The samples contained a 50/50 mixture of Irganox 1010 and Irgafos 168 at the indicated levels. Samples of homopolymer and copolymers were irradiated to dosages of 15 and 20 Mrads with gamma radiation and also tested for melt flow rate. The test results and the percentages of ethylene in the copolymers are set forth in Table 6 below.

TABLE 6

| Sample No. | Ethylene Content | Antioxidant (ppm) | Melt Flow Rate (g/10 min) | | |
| --- | --- | --- | --- | --- | --- |
| | | | 0 Mrads | 15 Mrads | 20 Mrads |
| 1 | 0.0 | 2500 | 0.3 | 20.6 | 27.9 |
| 2 | 8.0 | — | 3.5 | 40.6 | 49.4 |
| 3 | 6.4 | 1500 | 1.5 | 54.9 | 37.1 |
| 4 | 6.7 | 1500 | 7.2 | 125.0 | 133.5 |
| 5 | 6.3 | 1500 | 0.4 | 6.3 | 11.3 |
| 6 | 5.4 | 1500 | 0.3 | 17.0 | 14.5 |
| 7 | 5.4 | 1500 | 0.02 | 13.7 | 16.9 |
| 8 | 3.5 | 1500 | 0.02 | 11.5 | 14.7 |
| 9 | 6.1 | 1500 | 0.01 | 7.2 | 8.6 |
| 10 | 7.0 | 1500 | 0.01 | 8.1 | 11.0 |

The results recorded above demonstrate that the crosslinking efficiency as measured by the change in melt flow rate upon irradiation is optimum for homopolymers and copolymers having a melt flow rate of 0.5 or less and for propylene-ethylene copolymers having an ethylene content greater than about 6.0%.

While particular embodiments of the present invention have been illustrated and described, it will be apparent to those skilled in the art that various changes and modifications may be made without departing from the spirit and scope of the invention.

We claim:

1. A polymer composition having improved resistance to thermoforming sag, the composition comprising:

from about 1.3 to about 10 wt % of a substantially gelled irradiated first polymer having a melt flow rate of less than 0.5 g/10 min. prior to irradiation, said first polymer selected from the group consisting of propylene homopolymers, propylene-ethylene copolymers having an ethylene content of at least 6% and mixtures thereof and including from 500 to 3000 ppm of an antioxidant, said first polymer being irradiated in air with from 10 to 20 Mrads of gamma or electron beam ionizing radiation and containing at least 30 wt. % xylene insolubles after irradiation;

from about 90 to 98.7 wt. % a non-irradiated second polymer selected from the group consisting of polypropylene, propylene-ethylene copolymers or mixtures thereof;

the combined first polymer and non-irradiated second polymer comprising a polymer composition having at least a 10 % increase in elasticity in the molten state as compared to the elasticity of said non-irradiated polymer in the molten state.

2. The polymer composition of claim 1 wherein the antioxidant is selected from the group consisting of substituted phenols, amines, phosphites, thioesters, thio compounds containing oxidizable sulphur, phosphonates, aryl nitroso compounds, 4,4',4''-[(2,4,6-trimethyl- 1,3,5-benzenetriyl)tris(methylene)]tris[2,6-bis(1,1 dimethylethyl)phenol], 2,6-di-tert-butyl-para-cresol, 2,2-bis[[3-[3,5-bis(1,1 dimethylethyl)-4-hydroxyphenyl]-1-oxopropoxy]methyl]-1,3-propanoate propoanediyl 3,5-bis(1,1-dimethylethyl)-4-hydroxybenzene and 2,4-bis(1,1 dimethylethyl)phenylphosphite and mixtures thereof.

3. A process for the production of a polymer composition having improved resistance to thermoforming sag comprising:

mixing (a) 1.3 to about 10 wt % of a substantially gelled irradiated first polymer selected from the group consisting of propylene homopolymers, propylene-ethylene copolymers having an ethylene content of at least 6% and mixtures thereof and including from 500 to 3000 ppm of an antioxidant, said first polymer having a melt flow rate of less than 0.5 g/10 min. prior to irradiation and being irradiated in air with from 10 to 20 Mrads of gamma or electron beam ionizing radiation and containing at least 30 wt. % xylene insolubles after irradiation;

with (b) 90 to 98.7 wt. % a non-irradiated second polymer selected from the group consisting of polypropylene, propylene-ethylene copolymers or mixtures thereof;

said polymer composition having at least a 10% increase in elasticity in the molten state as compared to the elasticity of said non-irradiated polymer in the molten state.

4. The process of claim 3 wherein the antioxidant is selected from the group consisting of:

substituted phenols, amines, phosphites, thioesters, thio compounds containing oxidizable sulphur, phosphonates, aryl nitroso compounds, 4,4',4"-[(2,4,6-trimethyl-1,3,5-benzenetriyl)tris(methylene)]tris[2,6-bis(1,1 dimethylethyl)phenol], 2,6-di-tert-butyl-para-cresol, 2,2-bis[[3-[3,5-bis(1,1 dimethylethyl)-4-hydroxyphenyl]-1-oxopropoxy]methyl]-1,3-propanoate propoanediyl 3,5-bis(1,1-dimethylethyl)-4-hydroxybenzene and 2,4-bis(1,1 dimethylethyl)phenylphosphite and mixtures thereof.

* * * * *

UNITED STATES PATENT AND TRADEMARK OFFICE
CERTIFICATE OF CORRECTION

PATENT NO. : 5,439,949
DATED : August 8, 1995
INVENTOR(S) : Bennie M. Lucas, V. Krishnamurthy & John R. Bonser It is certified that error appears in the above-indentified patent and that said Letters Patent is hereby corrected as shown below:

Column 3, line 9, "thermmoforming" should be --thermoforming--.

Column 3, lines 12-13, "thermmoforming" should be --thermoforming--.

Column 8, line 15, title heading of column 2, "Antioxi-Ethylene Content" should be --Ethylene Content--.

Column 8, line 15, title heading of column 3, "dant (ppm)" should be --Antioxidant (ppm)--.

Signed and Sealed this

Second Day of July, 1996

Attest:

BRUCE LEHMAN

Attesting Officer

Commissioner of Patents and Trademarks